United States Patent
Wakana (10) Patent No.: US 12,409,497 B2
(45) Date of Patent: Sep. 9, 2025

(54) THREE-DIMENSIONAL DEPOSITION DEVICE AND METHOD

(71) Applicants: Mitsubishi Heavy Industries Machine Tool Co., Ltd., Ritto (JP); Technology Research Association for Future Additive Manufacturing, Tokyo (JP)

(72) Inventor: Tomohiro Wakana, Shiga (JP)

(73) Assignees: MITSUBISHI HEAVY INDUSTRIES MACHINE TOOL CO., LTD., Ritto (JP); TECHNOLOGY RESEARCH ASSOCIATION FOR FUTURE ADDITIVE MANUFACTURING, Tokyo (JP)

(*) Notice: Subject to any disclaimer, the term of this patent is extended or adjusted under 35 U.S.C. 154(b) by 1078 days.

(21) Appl. No.: 17/426,521

(22) PCT Filed: Dec. 13, 2019

(86) PCT No.: PCT/JP2019/048861
§ 371 (c)(1),
(2) Date: Jul. 28, 2021

(87) PCT Pub. No.: WO2020/250462
PCT Pub. Date: Dec. 17, 2020

(65) Prior Publication Data
US 2022/0097143 A1 Mar. 31, 2022

(30) Foreign Application Priority Data
Jun. 11, 2019 (JP) .................................. 2019-108958

(51) Int. Cl.
B29C 67/00 (2017.01)
B22F 10/28 (2021.01)
(Continued)

(52) U.S. Cl.
CPC .............. *B22F 10/85* (2021.01); *B22F 10/28* (2021.01); *B22F 12/90* (2021.01); *B23K 26/34* (2013.01);
(Continued)

(58) Field of Classification Search
CPC .......... B22F 10/85; B22F 10/28; B22F 12/90; B33Y 10/00; B33Y 30/00; B33Y 50/00; B33Y 50/02; B23K 26/34
See application file for complete search history.

(56) References Cited

U.S. PATENT DOCUMENTS

| 5,837,960 A | 11/1998 | Lewis et al. |
| 5,961,862 A | 10/1999 | Lewis et al. |

(Continued)

FOREIGN PATENT DOCUMENTS

| CN | 108580900 A | 9/2018 |
| JP | 11-179573 A | 7/1999 |

(Continued)

OTHER PUBLICATIONS

Extended European Search Report for European Application No. 19932681.0, dated Mar. 28, 2022.

*Primary Examiner* — Ryan M Ochylski
(74) *Attorney, Agent, or Firm* — Birch, Stewart, Kolasch & Birch, LLP (57) ABSTRACT

In the three-dimensional deposition device and the three-dimensional deposition method, included are: a powder passage and a nozzle injection opening serving as a powder supply unit that supplies powder toward an object to be processed; a laser path serving as a light irradiation unit that irradiates the powder with a laser beam to sinter or melt and solidify at least a part of the powder irradiated with the laser beam to form a formed layer; an interference information acquisition unit that acquires interference information on the (Continued)

object to be processed with the powder injected from the nozzle injection opening based on the shape of the object to be processed; and a controller that changes the powder passage of the powder that the nozzle injection opening supplies to the object to be processed based on the interference information acquired by the interference information acquisition unit.

7 Claims, 6 Drawing Sheets

(51) Int. Cl.
*B22F 10/85* (2021.01)
*B22F 12/90* (2021.01)
*B23K 26/34* (2014.01)
*B33Y 10/00* (2015.01)
*B33Y 30/00* (2015.01)
*B33Y 50/02* (2015.01)

(52) U.S. Cl.
CPC ............... *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 5,993,554 A | 11/1999 | Keicher et al. | |
| 6,823,230 B1* | 11/2004 | Jamalabad | G05B 19/4099 |
| | | | 700/182 |
| 10,124,410 B2 | 11/2018 | Kanko et al. | |
| 10,586,630 B2 | 3/2020 | Yoshimura et al. | |
| 10,898,971 B2 | 1/2021 | Yoshimura | |
| 2006/0003095 A1* | 1/2006 | Bullen | B22F 3/004 |
| | | | 427/256 |
| 2016/0311027 A1 | 10/2016 | Shimoyama | |

FOREIGN PATENT DOCUMENTS

| | | |
|---|---|---|
| JP | 2015-178192 A | 10/2015 |
| JP | 2015-196264 A | 11/2015 |
| TW | I600485 B | 10/2017 |
| TW | I643687 B | 12/2018 |
| WO | WO 2016/151781 A1 | 9/2016 |
| WO | WO 2018/134605 A1 | 7/2018 |

\* cited by examiner

THREE-DIMENSIONAL DEPOSITION DEVICE AND METHOD

FIELD

The present disclose relates to a three-dimensional deposition device to manufacture a three-dimensional object by deposition and a three-dimensional deposition method.

BACKGROUND

As a technique of manufacturing a three-dimensional object, there is known a deposition shaping technique of manufacturing a three-dimensional object by irradiating a metallic powder material with a light beam. As a deposition shaping technique, for example, there is a technique disclosed in Patent Literature 1. The technique disclosed in Patent Literature 1 is a technique of forming a sintered layer by irradiating a powder layer formed of a metallic powder material with a light beam and manufacturing a three-dimensional object, in which a plurality of sintered layers are integrally deposited, by repeating this process.

CITATION LIST

Patent Literature

Patent Literature 1: Japanese Patent Application Laid-open No. 2015-196264

SUMMARY

Technical Problem

In the above-described deposition shaping, a light beam is emitted from a center of a deposition head toward an object to be processed, and a metal powder material is injected from a plurality of locations around the deposition head toward a focal point of the light beam, whereby the metal powder material is heated and melted with the light beam. By the way, in a process of three-dimensional deposition work, or when three-dimensional deposition is performed on an object to be processed manufactured by machining, a working surface has an uneven shape in some cases. When the working surface has an uneven shape, part of the metal powder material injected toward the focal point of the light beam may interfere with a convex part on the working surface. Then, the metal powder material that interferes with the convex part of the working surface scatters in a path of the light beam and attenuates output of the light beam. In addition, part of the metal powder material does not reach the focal point of the light beam, that is, the object to be processed, which makes an amount of deposition of the metal powder material insufficient. This results in a problem in that quality of a three-dimensional object is degraded.

The present disclosure solves the above-described problem, and aims to provide a three-dimensional deposition device and a three-dimensional deposition method for improving the quality of a three-dimensional object.

Solution to Problem

To achieve the objective described above, a three-dimensional deposition device of the present disclosure is configured to form a three-dimensional object by depositing a formed layer on an object to be processed, the three-dimensional deposition device comprising: a powder supply unit configured to supply a powder material to a working surface of the object to be processed: a light irradiation unit configured to irradiate the powder material with a light beam to sinter or melt and solidify at least a part of the powder material irradiated with the light beam to form the formed layer; an interference information acquisition unit configured to acquire interference information on the object to be processed with the powder material injected from the powder supply unit based on the shape of the object to be processed; and a controller configured to change a supply path of the powder material supplied from the powder supply unit to a working surface of the object to be processed based on the interference information acquired by the interference information acquisition unit.

Therefore, the interference information acquisition unit acquires interference information on the object to be processed with the powder material injected from the powder supply unit based on the shape of the object to be processed, and the controller changes the supply path of the powder material supplied from the powder supply unit to the working surface of the object to be processed based on the interference information. In other words, the controller identifies an area where the powder material injected from the powder supply unit interferes with the object to be processed, and the powder supply unit supplies the powder material to the working surface of the object to be processed from an area where the powder material injected from the powder supply unit does not interfere with the object to be processed. As a result, the powder material does not interfere with the object to be processed and does not scatter, the output of the light beam is not attenuated, and a determined amount of powder material can be supplied to the object to be processed, whereby the quality of the three-dimensional object can be improved.

In the three-dimensional deposition device of the present disclosure, the powder supply unit includes a plurality of powder injection units provided around the light irradiation unit at predetermined intervals in a circumferential direction, and the controller stops injection of the powder material from the powder injection unit injecting the powder material that is estimated to interfere with the object to be processed.

Therefore, the controller stops injection of the powder material from a powder injection unit that injects the powder material that is estimated to interfere with the object to be processed, injects the powder material from a remaining powder injection unit, and prevents scattering of the powder material occurring when the powder material interferes with the object to be processed, while it is possible to properly supply the powder material to the object to be processed, and to properly manufacture a three-dimensional object regardless of the shape of the object to be processed.

In the three-dimensional deposition device of the present disclosure, when the controller stops the injection of the powder material from the powder injection unit that injects the powder material that is estimated to interfere with the object to be processed, the controller increases an injection amount of the powder material injected from the powder injection unit other than the powder injection unit that has stopped the injection of the powder material.

Therefore, when the controller stops injection of the powder material from the powder injection unit that injects the powder material that is estimated to interfere with the object to be processed, the controller increases the injection amount of the powder material from the remaining powder injection unit, so that it is possible to constantly supply a proper amount of the powder material to the object to be processed and to prevent degradation of the quality of the three-dimensional object.

In the three-dimensional deposition device of the present disclosure, when the controller stops the injection of the powder material from the powder injection unit that injects the powder material that is estimated to interfere with the object to be processed, the controller adjusts output of the light beam emitted from the light irradiation unit.

Therefore, when injection of the powder material from the powder injection unit that injects powder material that is estimated to interfere with the object to be processed stops, the output of the light beam emitted from the light irradiation unit is adjusted, so that it is possible to output a light beam corresponding to the reduced amount of supply of the powder material and to prevent degradation of the quality of the three-dimensional object.

In the three-dimensional deposition device of the present disclosure, when the controller stops the injection of the powder material from the powder injection unit that injects the powder material that is estimated to interfere with the object to be processed, the controller adjusts the processing speed of the object to be processed.

Therefore, when injection of the powder material from the powder injection unit that injects powder material that is estimated to interfere with the object to be processed stops, the processing speed of the object to be processed is adjusted, so that the processing speed becomes a processing speed corresponding to the reduced amount of supply of the powder material and it is possible to prevent degradation of the quality of the three-dimensional object.

In the three-dimensional deposition device of the present disclosure, the interference information acquisition unit acquires a shape of the object to be processed in advance, an operating program of the powder supply unit and the light irradiation unit is set based on the acquired shape of the object to be processed, and the controller controls the powder supply unit or the light irradiation unit based on the operating program.

Therefore, the controller controls the powder supply unit or the light irradiation unit based on the operating program of the powder supply unit and the light irradiation unit that are set based on the shape of the object to be processed, so that interference between the injected powder material and the object to be processed can be prevented regardless of the shape of the object to be processed.

In the three-dimensional deposition device of the present disclosure, the interference information acquisition unit includes a detector that detects or estimates a reaching status of the powder material supplied from the powder supply unit to the object to be processed, and the controller controls the powder supply unit based on a detection result obtained by the detector.

Therefore, the controller controls the powder supply unit based on the reaching status of the powder material to the object to be processed that is detected or estimated by the detector, so that interference between the injected powder material and the object to be processed can be prevented regardless of the shape of the object to be processed.

The three-dimensional deposition method of the present disclosure is for forming a three-dimensional object by depositing a formed layer on an object to be processed, the three-dimensional deposition method comprising: a step of supplying a powder material toward a working surface of the object to be processed;

a step of irradiating the powder material with a light beam to sinter or melt and solidify at least a part of the powder material irradiated with the light beam to form the formed layer; a step of acquiring interference information on the object to be processed with the powder material based on the shape of the object to be processed; and and a step of changing a supply path of the powder material to the object to be processed based on the interference information.

Therefore, the area where the powder material injected from the powder supply unit interferes with the object to be processed is identified, and the powder supply unit supplies the powder material to the working surface of the object to be processed from the area where the powder material injected from the powder supply unit does not interfere with the object to be processed. As a result, the powder material does not interfere with the object to be processed and does not scatter, the output of the light beam is not attenuated, and a determined amount of powder material can be supplied to the object to be processed, whereby the quality of the three-dimensional object can be improved.

Advantageous Effects of Invention

According to the three-dimensional deposition device and the three-dimensional deposition method of the present disclosure, it is possible to improve the quality of a three-dimensional object.

DESCRIPTION OF EMBODIMENTS

Hereinafter, preferred embodiments of the disclosure will be described in detail with reference to the accompanying drawings. It is noted that the disclosure is not limited to the embodiment. Then, when there are a plurality of embodiments, a combination of the embodiments may be employed.

Figure 1:
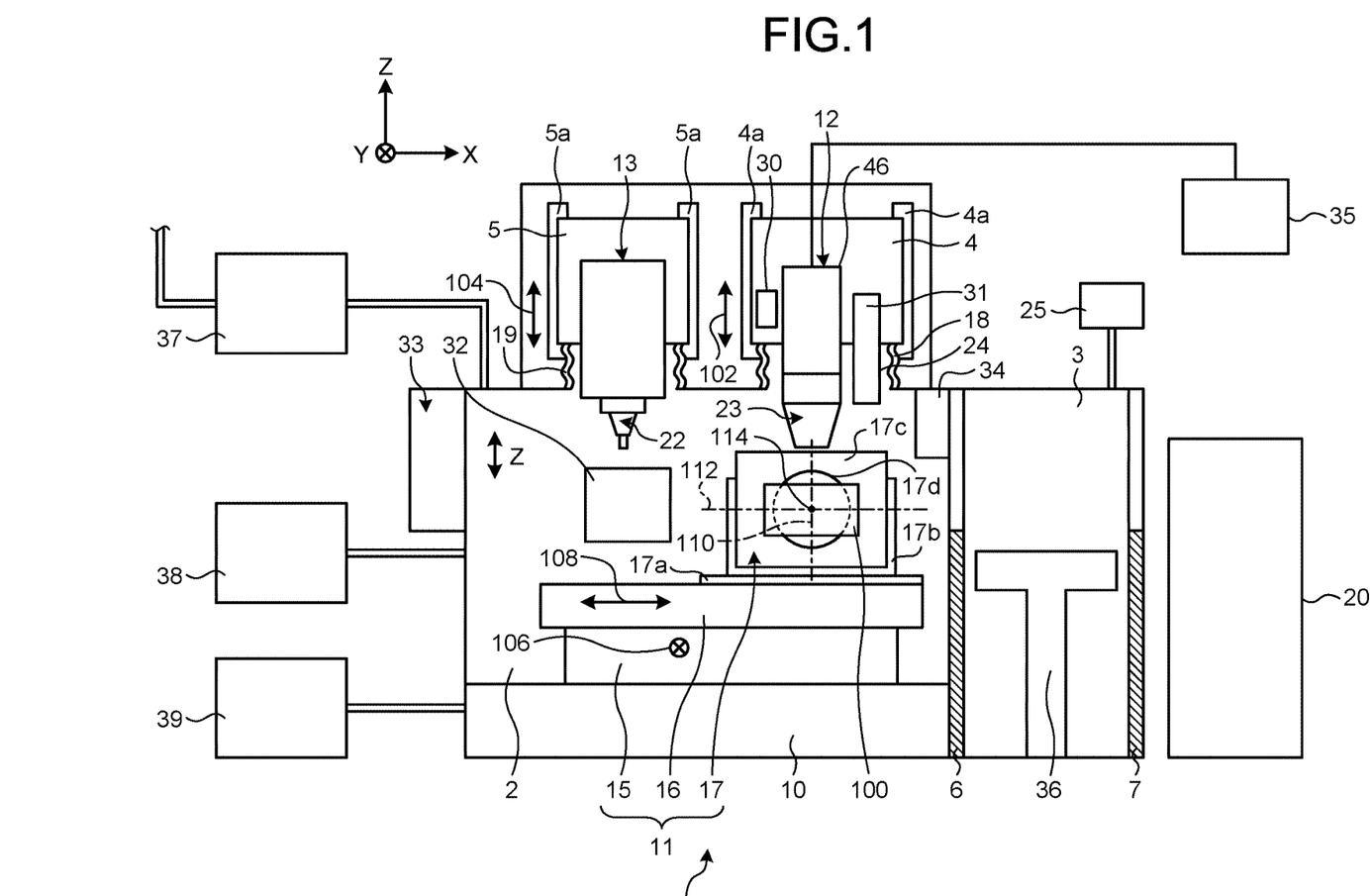
FIG. 1 is a schematic view illustrating a three-dimensional deposition device of the present embodiment.

FIG. 1 is a schematic diagram illustrating a three-dimensional deposition device 1 of an embodiment. Here, in the present embodiment, one direction within a horizontal plane will be set as an X-axis direction, a direction orthogonal to the X-axis direction within the horizontal plane will be set as a Y-axis direction, and a direction (a vertical direction) orthogonal to each of the X-axis direction and the Y-axis direction will be set as a Z-axis direction.

As illustrated in FIG. 1, the three-dimensional deposition device 1 is a device that manufactures a three-dimensional object on a base unit 100. The base unit 100 is a base member on which the three-dimensional object is formed.

The base unit 100 is carried to a predetermined position of the three-dimensional deposition device 1, so that the three-dimensional object is formed on a working surface thereof. The base unit 100 of the present embodiment is a plate-shaped member. Additionally, the base unit 100 is not limited thereto. As the base unit 100, a base member of the three-dimensional object may be used or a member adding the three-dimensional object may be used. A member corresponding to a component or a product, by forming the three-dimensional object at a predetermined position, may be used as the base unit 100.

The three-dimensional deposition device 1 includes a three-dimensional deposition chamber 2, a spare chamber 3, a deposition head accommodation chamber 4, a machining unit accommodation chamber 5, a bed 10, a table unit 11, a deposition head 12, a machining unit 13, a control device 20, a shape measurement unit 30, a heating head 31, a device measurement unit 32, a tool exchange unit 33, a nozzle exchange unit 34, a powder introduction unit 35, a base movement unit 36, an air discharge unit 37, a gas introduction unit 38, and a powder collection unit 39.

The three-dimensional deposition chamber 2 is a casing (a chamber) in which a part other than a designed communication part, such as a connected pipe, is sealed from the outside. It is noted that the designed communication part is provided with a valve or the like that switches a sealed state and an opened state. As required, the three-dimensional deposition chamber 2 can be in the sealed state. The three-dimensional deposition chamber 2 includes therein the bed 10, the table unit 11, the deposition head 12, a part of the machining unit 13, a part of the heating head 31, the device measurement unit 32, the tool exchange unit 33, and the nozzle exchange unit 34.

The spare chamber 3 is provided adjacent to the three-dimensional deposition chamber 2. In the spare chamber 3, a part other than a designed communication part, such as a connection pipe, is sealed from the outside. The spare chamber 3 is formed as a decompression chamber which connects the outside and the three-dimensional deposition chamber 2 to each other. The base movement unit 36 is provided inside the spare chamber 3. Here, the spare chamber 3 is formed such that, for example, a door 6 having airtightness is provided at the connection part of the three-dimensional deposition chamber 2. Furthermore, the spare chamber 3 is connected to the outside by the airtight door 7. Furthermore, the spare chamber 3 is provided with an air discharge unit 25 that discharges air from the spare chamber 3. When the door 7 is opened, a necessary member can be carried into the spare chamber 3 from the outside. Furthermore, when the door 6 is opened, a member can be carried between the spare chamber 3 and the three-dimensional deposition chamber 2.

The deposition head accommodation chamber 4 is provided at an upper face of the three-dimensional deposition chamber 2 in the Z-axis direction. The deposition head accommodation chamber 4 is supported by a Z-axis slide unit 4a to be movable in the Z-axis direction (a direction of an arrow 102) with respect to the three-dimensional deposition chamber 2. A lower surface of the deposition head accommodation chamber 4 in the Z-axis direction is connected to the three-dimensional deposition chamber 2 by a bellows 18. The bellows 18 connects the lower surface of the deposition head accommodation chamber 4 in the Z-axis direction to the three-dimensional deposition chamber 2, so that the lower surface of the deposition head accommodation chamber 4 in the Z-axis direction serves as a part of the three-dimensional deposition chamber 2. Furthermore, the three-dimensional deposition chamber 2 is formed so that an opening is formed in an area surrounded by the bellows 18. A space surrounded by the lower surface of the deposition head accommodation chamber 4 in the Z-axis direction and the bellows 18 is connected to the three-dimensional deposition chamber 2 and is sealed along with the three-dimensional deposition chamber 2. The deposition head accommodation chamber 4 supports the deposition head 12, the shape measurement unit 30, and the heating head 31. Furthermore, a part including a nozzle 23 of the deposition head 12 and a part including a front end 24 of the heating head 31 protrude toward the three-dimensional deposition chamber 2 from the lower surface of the deposition head accommodation chamber 4 in the Z-axis direction.

When the deposition head accommodation chamber 4 moves in the Z-axis direction by the Z-axis slide unit 4a, the deposition head 12, the shape measurement unit 30, and the heating head 31 held therein are moved in the Z-axis direction. Furthermore, the deposition head accommodation chamber 4 is connected to the three-dimensional deposition chamber 2 through the bellows 18, so that the bellows 18 is deformed in accordance with the movement in the Z-axis direction and the sealed state between the three-dimensional deposition chamber 2 and the deposition head accommodation chamber 4 can be maintained.

The machining unit accommodation chamber 5 is provided at the upper face of the three-dimensional deposition chamber 2 in the Z-axis direction. Furthermore, the machining unit accommodation chamber 5 is disposed adjacent to the deposition head accommodation chamber 4. The machining unit accommodation chamber 5 is supported by a Z-axis slide unit 5a to be movable in the Z-axis direction (a direction of an arrow 104) with respect to the three-dimensional deposition chamber 2. A lower face of the machining unit accommodation chamber 5 in the Z-axis direction is connected to the three-dimensional deposition chamber 2 by a bellows 19. The bellows 19 connects the lower face of the machining unit accommodation chamber 5 in the Z-axis direction to the three-dimensional deposition chamber 2 so that the lower face of the machining unit accommodation chamber 5 in the Z-axis direction is formed as a part of the three-dimensional deposition chamber 2. Furthermore, the three-dimensional deposition chamber 2 is formed so that an opening is formed in an area surrounded by the bellows 19. A space surrounded by the lower face of the machining unit accommodation chamber 5 in the Z-axis direction and the bellows 19 is connected to the three-dimensional deposition chamber 2 and is sealed along with the three-dimensional deposition chamber 2. The machining unit accommodation chamber 5 supports the machining unit 13. Furthermore, the machining unit accommodation chamber 5 is formed so that a part including a tool 22 of the machining unit 13 protrudes toward the three-dimensional deposition chamber 2 from the lower face in the Z-axis direction.

When the machining unit accommodation chamber 5 moves in the Z-axis direction by the Z-axis slide unit 5a, the machining unit 13 held therein is moved in the Z-axis direction. Furthermore, the machining unit accommodation chamber 5 is connected to the three-dimensional deposition chamber 2 through the bellows 19, so that the bellows 19 is deformed in accordance with the movement in the Z-axis direction and the sealed state between the three-dimensional deposition chamber 2 and the machining unit accommodation chamber 5 can be maintained.

The bed 10 is provided at a bottom in the three-dimensional deposition chamber 2 in the Z-axis direction. The bed 10 supports the table unit 11. Various wirings, pipes, or driving assemblies are disposed on the bed 10.

The table unit 11 is disposed on an upper face of the bed 10 and supports the base unit 100. The table unit 11 includes a Y-axis slide unit 15, an X-axis slide unit 16, and a rotation table unit 17. The table unit 11 has the base unit 100 attached thereto and moves the base unit 100 on the bed 10.

The Y-axis slide unit 15 moves the X-axis slide unit 16 in the Y-axis direction (a direction of an arrow 106) with respect to the bed 10. The X-axis slide unit 16 is fixed to a member corresponding to a movable part of the Y-axis slide unit 15, and moves the rotation table unit 17 in the X-axis direction (a direction of an arrow 108) with respect to the Y-axis slide unit 15. The rotation table unit 17 is fixed to a member corresponding to a movable part of the X-axis slide unit 16 and supports the base unit 100. The rotation table unit 17 is, for example, an inclined circular table and includes a fixing base 17a, a rotation table 17b, an inclination table 17c, and a rotation table 17d. The fixing base 17a is fixed to a member corresponding to a movable part of the X-axis slide unit 16. The rotation table 17b is supported by the fixing base 17a. The rotation table 17b rotates about a rotation shaft 110 which is a rotation axis and is parallel to the Z-axis direction. The inclination table 17c is supported by the rotation table 17b. The inclination table 17c rotates about a rotation shaft 112 which is an axis and is orthogonal to a face supporting the rotation table 17b. The rotation table 17d is supported by the inclination table 17c. The rotation table 17d rotates about a rotation shaft 114 which is an axis and is orthogonal to a surface supporting the inclination table 17c. The rotation table 17d fixes the base unit 100.

In this way, the rotation table unit 17 can rotate the base unit 100 about three orthogonal axes by rotating corresponding components thereof about the rotation shafts 110, 112, and 114. The table unit 11 moves the base unit 100 fixed to the rotation table unit 17 in the Y-axis direction and the X-axis direction by the Y-axis slide unit 15 and the X-axis slide unit 16. Furthermore, the table unit 11 rotates the base unit 100 about the three orthogonal axes by rotating the corresponding components thereof about the rotation shafts 110, 112, and 114 by the rotation table unit 17. The table unit 11 may further move the base unit 100 in the Z-axis direction.

The deposition head 12 injects a powder material toward the base unit 100, irradiates the powder material injected onto the base unit with a laser beam (light beam) to melt the powder, and solidifies the melted powder on the base unit 100 to form a formed layer. The powder which is introduced into the deposition head 12 is powder which is used as a raw material of the three-dimensional object. In the embodiment, for example, a metal material such as iron, copper, aluminum, or titanium can be used as the powder. As the powder, a material such as ceramic other than the metal material may be used. The deposition head 12 is provided at a position facing the upper face of the bed 10 in the Z-axis direction and faces the table unit 11. A lower part of the deposition head 12 in the Z-axis direction is provided with the nozzle 23. The nozzle 23 is attached to a main body 46 of the deposition head 12.

Figure 2:
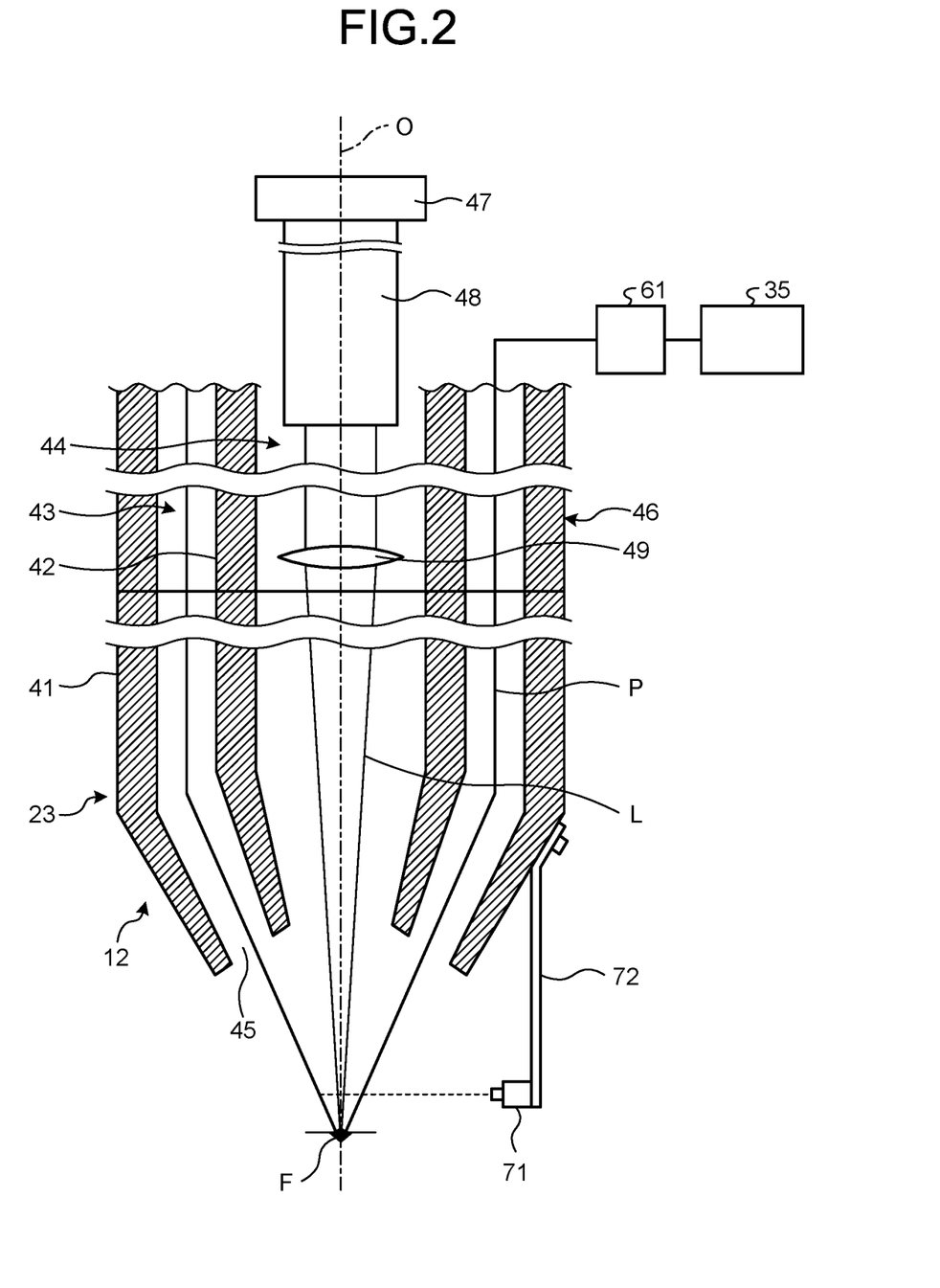
FIG. 2 is a longitudinal sectional view illustrating an example of a front end of a deposition head.
Figure 3:
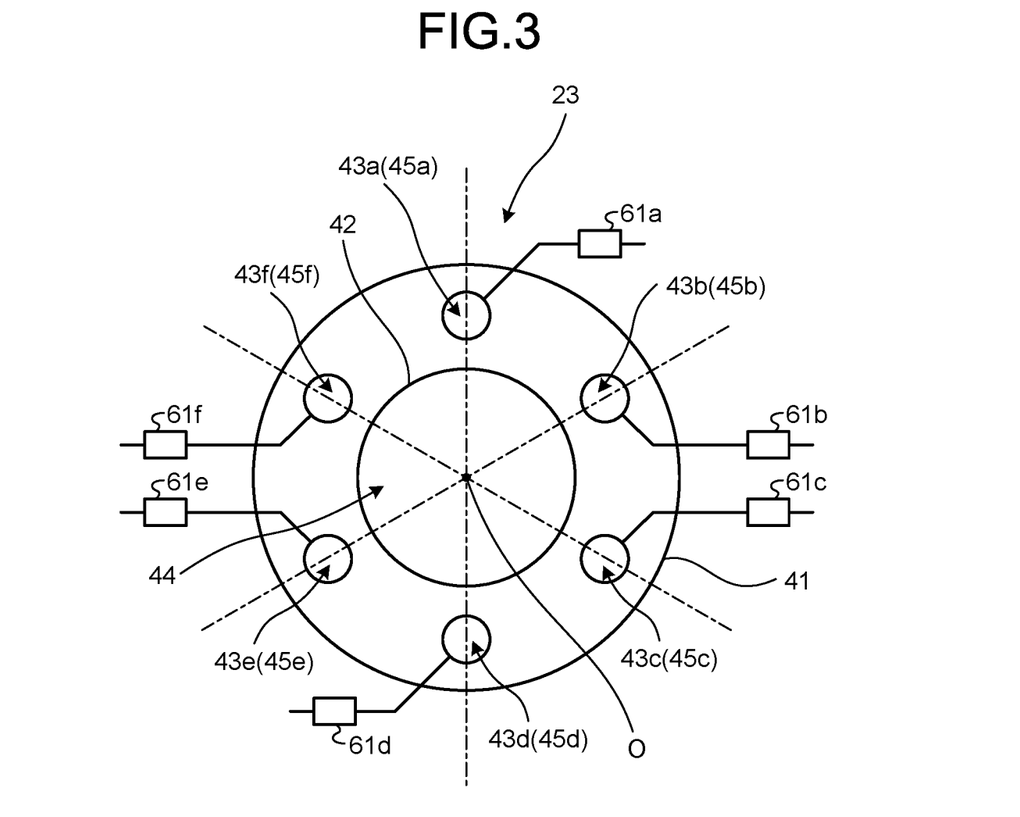
FIG. 3 is a horizontal sectional view illustrating an example of the front end of the deposition head.

FIG. 2 is a longitudinal sectional view illustrating an example of a front end of the deposition head and FIG. 3 is a horizontal sectional view illustrating an example of the front end of the deposition head.

As illustrated in FIG. 2 and FIG. 3, the nozzle 23 is a double tube including an outer tube 41 and an inner tube 42 inserted into the outer tube 41. The outer tube 41 is a tubular member and is formed so that a diameter decreases toward a front end (downward in the Z-axis direction). The inner tube 42 is inserted into the outer tube 41. The inner tube 42 is also a tubular member and has a shape in which a diameter decreases toward a front end (downward in the Z-axis direction). In the nozzle 23, powder passages (powder supply unit) 43, through which powder (powder material) P passes, are formed between an inner periphery of the outer tube 41 and an outer periphery of the inner tube 42. An inner peripheral face side of the inner tube 42 serves as a laser path (light irradiation unit) 44 through which a laser beam passes. Here, the main body 46 to which the nozzle 23 is attached is a double tube similarly to the nozzle 23 and the powder passages 43 and the laser path 44 are also formed in this way. In the deposition head 12, the powder passages 43 are disposed to surround the periphery of the laser path 44. In the present embodiment, the powder passages 43 serve as powder injection units that inject the powder. In the deposition head 12, the powder P introduced from the powder introduction unit 35 flows through the powder passages 43 and is injected from respective nozzle injection openings (powder injection units) 45, which are end openings between the outer tube 41 and the inner tube 42. Furthermore, a supply amount control unit 61 is provided for each of the powder passages 43 connected to the powder introduction unit 35.

The deposition head 12 injects the powder P so as to have a predetermined convergence diameter at a predetermined convergence position. The convergence diameter is the diameter of a trajectory of the powder P when the diameter of the trajectory of the injected powder P is minimized. As described above, since the diameter of the nozzle 23 decreases toward the front end thereof, the deposition head 12 injects the powder P so as to converge inward in a radiation direction. That is, the deposition head 12 injects the powder P so that the trajectory of the powder P has a predetermined convergence diameter. Furthermore, the convergence position is a position where the trajectory of the injected powder P converges.

The deposition head 12 is provided with a light source 47, an optical fiber 48, and a light concentrating unit 49. The light source 47 outputs a laser beam. The optical fiber 48 guides a laser output from the light source 47 to the laser path 44. The light concentrating unit 49 is disposed in the laser path 44 and is disposed in an optical path of the laser output from the optical fiber 48. The light concentrating unit 49 concentrates a laser beam L output from the optical fiber 48. The laser beam L which is collected by the light concentrating unit 49 is output from an end of the inner tube 42. In the deposition head 12, the light concentrating unit 49 is disposed in the main body 46, but a part or the entirety of the light concentrating unit 49 may be disposed in the nozzle 23. When a part or the entirety of the light concentrating unit 49 is disposed in the nozzle 23, a focal position can be changed to a different position by the exchange of the nozzle 23.

The deposition head 12 is provided with the laser path 44, through which the laser beam L passes, at the position of a central axis O, and is provided with a plurality of powder passages 43 outside the laser path 44. Each of the powder passages 43 is provided with the supply amount control unit 61. In the present embodiment, six powder passages 43a, 43b, 43c, 43d, 43e, and 43f are provided, six nozzle injection openings 45a, 45b, 45c, 45d, 45e, and 45f are provided. The six powder passages 43a, 43b, 43c, 43d, 43e, and 43f are provided with supply amount control units 61a, 61b, 61c, 61d, 61e, and 61f, respectively. The supply amount control units 61a, 61b, 61c, 61d, 61e, and 61f are each configured by, for example, a device using a pump, a switching valve, or the like. The supply amount control units 61*a*, 61*b*, 61*c*, 61*d*, 61*e*, and 61*f* can supply the powder P by opening the powder passages 43*a*, 43*b*, 43*c*, 43*d*, 43*e*, and 43*f*, respectively, or can stop the supply of the powder P by closing the powder passages 43*a*, 43*b*, 43*c*, 43*d*, 43*e*, and 43*f*, respectively. Moreover, the supply amount control units 61*a*, 61*b*, 61*c*, 61*d*, 61*e*, and 61*f* are not limited to two-stage control of opening and closing, and, for example, change the output of the respective pumps, so as to increase or decrease the introduction amount of the powder P introduced into the powder passages 43*a*, 43*b*, 43*c*, 43*d*, 43*e*, and 43*f* from the powder introduction unit 35, that is, the injection amount of the powder P injected from the nozzle injection openings 45*a*, 45*b*, 45*c*, 45*d*, 45*e*, and 45*f*, enabling provision of a desired amount of powder supply. Additionally, it is preferable that the six powder passages 43*a*, 43*b*, 43*c*, 43*d*, 43*e*, and 43*f* and the six nozzle injection openings 45*a*, 45*b*, 45*c*, 45*d*, 45*e*, and 45*f* are provided at equal intervals in a circumferential direction; however, they may not be provided at equal intervals. Furthermore, the number of the powder passages 43 and the number of the nozzle injection openings 45 are not limited to six, and it is sufficient if they are provided in a plural number.

The deposition head 12 injects the powder P from the powder passages 43 and outputs the laser beam L from the laser path 44. The powder P injected from the deposition head 12 enters an area irradiated with the laser beam L output from the deposition head 12, and is heated by the laser beam L at a focal point F of the laser beam L. The powder P irradiated with the laser beam L is melted and reaches the base unit 100. The powder P that has reached the base unit 100 in a melted state is cooled and solidified. Accordingly, a formed layer is formed on the base unit 100.

Here, the deposition head 12 of the present embodiment uses the optical fiber 48 to guide the laser beam L output from the light source 47; however, the present disclosure is not limited to using the optical fiber 48 and may use another transmission member. Furthermore, the light concentrating unit 49 may be provided in one of or both the main body 46 and the nozzle 23. Since the deposition head 12 of the present embodiment can be processed effectively, the powder passages 43 injecting the powder P and the laser path 44 emitting the laser beam L are provided coaxially; however, the present disclosure is not limited thereto. The deposition head 12 may be formed so that an assembly for injecting the powder P and an assembly for emitting the laser beam L are provided as separate members. The deposition head 12 of the present embodiment irradiates a powder material with a laser beam, but may emit a light beam other than the laser beam as long as the powder material can be melted or sintered.

As illustrated in FIG. 1, the machining unit 13 machines, for example, a formed layer or the like. The machining unit 13 is provided at a position facing the upper face of the bed 10 in the Z-axis direction and faces the table unit 11. The tool 22 is attached to a lower portion of the machining unit 13 in the Z-axis direction. Additionally, the machining unit 13 may be provided in the movable range of the base unit 100 using the table unit 11 above the bed 10 in the Z-axis direction. Here, the arrangement position is not limited to the position of the present embodiment.

Figure 4:
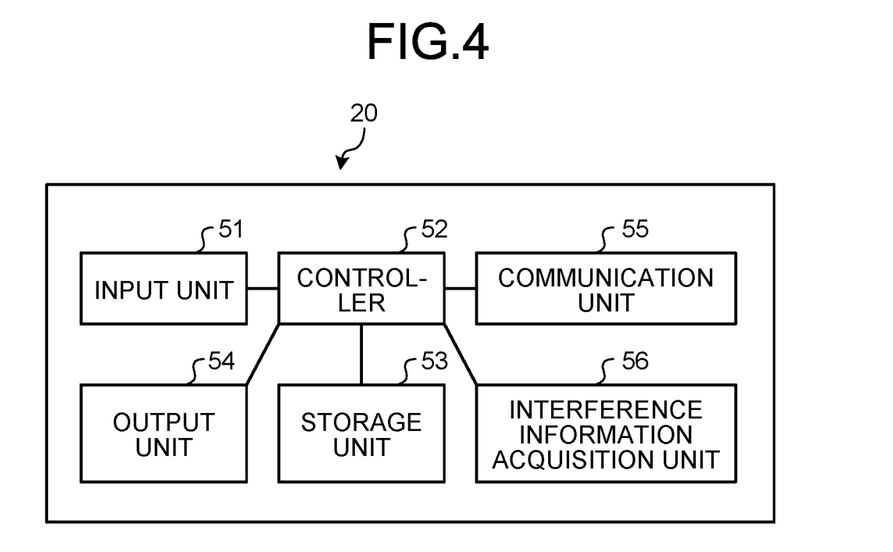
FIG. 4 is a schematic view illustrating a configuration of a control device.

FIG. 4 is a schematic diagram illustrating a configuration of the control device 20.

As illustrated in FIG. 1, the control device 20 is electrically connected to the driving units of the components (the above-described bed 10, table unit 11, deposition head 12, machining unit 13, shape measurement unit 30, heating head 31, device measurement unit 32, tool exchange unit 33, nozzle exchange unit 34, powder introduction unit 35, base movement unit 36, air discharge unit 37, gas introduction unit 38, powder collection unit 39, and the like) of the three-dimensional deposition device 1, and controls the operations of the components of the three-dimensional deposition device 1. The control device 20 is provided at the outside of the three-dimensional deposition chamber 2 or the spare chamber 3. The control device 20 includes, as illustrated in FIG. 4, an input unit 51, a controller 52, a storage unit 53, an output unit 54, a communication unit 55, and an interference information acquisition unit 56. The components of the input unit 51, the controller 52, the storage unit 53, the output unit 54, the communication unit 55, and the interference information acquisition unit 56 are electrically connected to one another.

The input unit 51 is, for example, an operation panel. An operator inputs information or an instruction to the input unit 51. The controller 52 includes, for example, a CPU (Central Processing Unit) and a memory. The controller 52 outputs an instruction for controlling the operations of the components of the three-dimensional deposition device 1 to the components of the three-dimensional deposition device 1. Furthermore, information and the like are input to the controller 52 from the components of the three-dimensional deposition device 1. The storage unit 53 is, for example, a storage device such as a RAM (Random Access Memory) or a ROM (Read Only Memory). The storage unit 53 stores therein an operation program for the three-dimensional deposition device 1 controlling the operations of the components by the controller 52 executing the program, information on the three-dimensional deposition device 1, design information on the three-dimensional object, and the like. The output unit 54 is, for example, a display. The output unit 54 displays, for example, information from the components of the three-dimensional deposition device 1, and the like. The communication unit 55 exchanges information with, for example, a communication line such as the Internet or a LAN (Local Area Network) by communicating with the communication line. The interference information acquisition unit 56 acquires interference information on the object to be processed with the powder P injected based on the shape of the object to be processed. Additionally, it is sufficient if the control device 20 includes at least the controller 52 and the storage unit 53. The control device 20 may output an instruction to the components of the three-dimensional deposition device 1 if the controller 52 and the storage unit 53 are provided.

Figure 5:
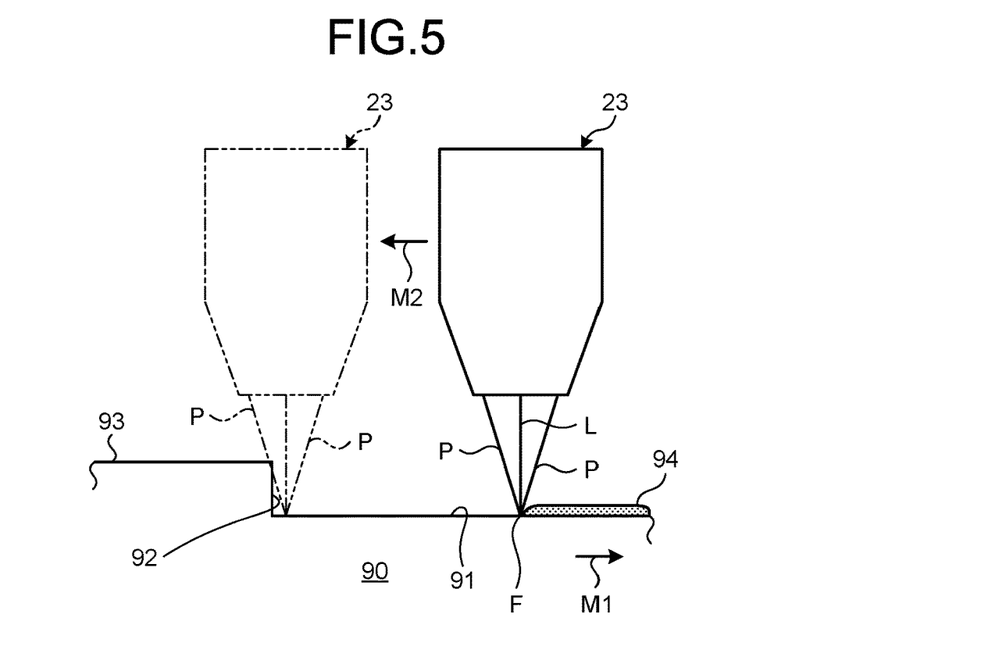
FIG. 5 is a schematic diagram illustrating a problem in manufacturing a three-dimensional object by the three-dimensional deposition device.

FIG. 5 is a schematic diagram illustrating a problem in manufacturing a three-dimensional object by the three-dimensional deposition device.

As illustrated in FIG. 5, the object 90 to be processed has a first working surface 91 along a horizontal direction, a step 92 along a vertical direction, and a second working surface 93 along the horizontal direction, and thus has an uneven shaped working surface. In practice, the object 90 to be processed moves in a movement direction M1 relative to the deposition head 12 for three-dimensional deposition, but since it is sufficient that the deposition head 12 and the object 90 to be processed move relative to each other, explanation is made herein under the presumption that the deposition head 12 moves in a processing direction M2. The deposition head 12 emits laser beam L and injects the powder P to the first working surface 91 and moves in the processing direction M2 to perform three-dimensional deposition to form a formed layer 94.

When the deposition head 12 transitions from the three-dimensional deposition on the first working surface 91 to three-dimensional deposition on the second working surface 93, the powder P injected on a forward side in the processing direction M2 interferes with the step 92 and part of the second working surface 93. Then, the powder P interfering with the step 92 and the part of the second working surface 93 scatters in the path of the laser beam L, and the output of the laser beam L is attenuated. In addition, part of the powder P does not reach the first working surface 91, which makes the amount of deposition of the powder P (the thickness of the formed layer 94) insufficient.

In the three-dimensional deposition device 1 of the present embodiment, as illustrated in FIG. 4, the interference information acquisition unit 56 acquires interference information on the object to be processed with the powder P injected from the nozzle injection openings 45 based on the shape of the object 90 to be processed (3D CAD data, STL data, modeling tool path data, for example). The controller 52 changes, based on the interference information, the powder passages (supply path) 43 of the powder P supplied from the nozzle injection openings 45 toward the working surface of the object 90 to be processed. The interference information includes, for example, when the three-dimensional deposition is performed based on a predetermined modeling tool path, information related to the position of a nozzle injection opening 45 that supplies the powder P estimated to be blocked in the convergence path by part of the object to be processed (which may be a part that has already been deposited) and unable to converge to a predetermined position.

As illustrated in FIG. 2 and FIG. 3, the deposition head 12 includes the powder passages 43a, 43b, 43c, 43d, 43e, and 43f at predetermined intervals in the circumferential direction around the laser path 44, and the nozzle injection openings 45a, 45b, 45c, 45d, 45e, and 45f are respectively provided to the front ends of the powder passages 43a, 43b, 43c, 43d, 43e, and 43f. The controller 52 instructs the supply amount control unit 61 to stop the injection of the powder P from a nozzle injection opening, among the nozzle injection openings 45a, 45b, 45c, 45d, 45e, and 45f, that injects the powder P that is estimated to interfere with the object 90 to be processed.

At this time, as a first control method of the present embodiment, the controller 52 instructs the supply amount control unit 61 to increase the injection amount of the powder P from nozzle injection opening other than the nozzle injection opening that has stopped the injection of the powder P, among the nozzle injection openings 45a, 45b, 45c, 45d, 45e, and 45f. A specific control method will be described later.

As a second control method of the present embodiment, the controller 52 reduces the output of the laser beam L emitted from the laser path 44 when stopping the injection of the powder P from the nozzle injection opening, among the nozzle injection openings 45a, 45b, 45c, 45d, 45e, and 45f, that injects the powder P that is estimated to interfere with the object to be processed. At this time, the controller 52 decreases the processing speed of the object 90 to be processed. A specific control method will be described later.

The interference information acquisition unit 56 acquires a shape of the object 90 to be processed (3D CAD data, STL data, modeling tool path data, for example) in advance, and an operating program for injection of the powder P and emission of the laser beam L is set based on the acquired shape of the object 90 to be processed and stored in the storage unit 53. The controller 52 controls the injection of the powder P and the emission of the laser beam L based on the operating program stored in the storage unit 53.

In the above description, the interference information acquisition unit 56 acquires the interference information on the powder P injected from the nozzle injection openings 45 with the object to be processed based on the shape of the object 90 to be processed, but it is not limited to this configuration. For example, as the interference information acquisition unit 56, a detector 71 may be provided that detects or estimates a reaching status of the powder P injected from the nozzle injection openings 45a, 45b, 45c, 45d, 45e, and 45f to the object to be processed. The controller 52 controls the injection of the powder P and the emission of the laser beam L based on a detection result obtained by the detector 71 (for example, whether the powder P interferes or can interfere with the object to be processed). This detector 71 is, for example, a laser detector or a CCD camera, and is fixed to the deposition head 12 via a bracket 72.

Figure 6:
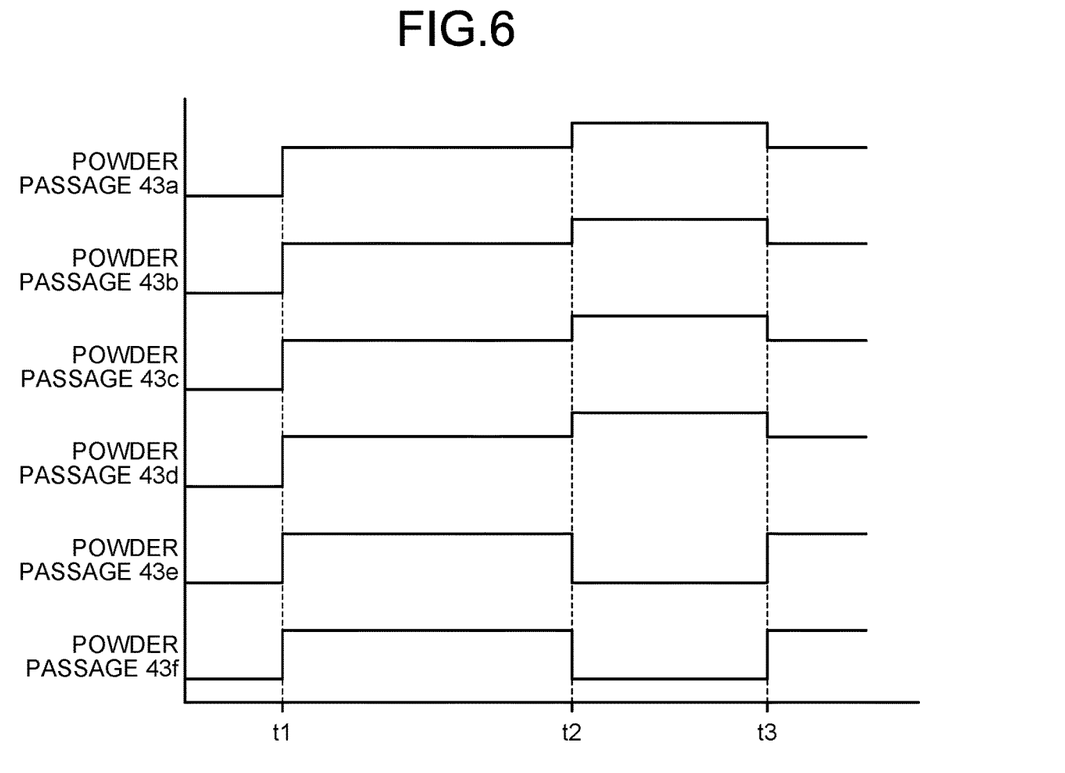
FIG. 6 is a time chart of a first control method of changing a supply path of a powder material by the control device.

The method of changing a supply path of the powder P by the control device 20 will now be explained. FIG. 6 is a time chart of the first control method of changing a supply path of a powder material by the control device.

In a method of manufacturing a three-dimensional object by the three-dimensional deposition device 1, as illustrated in FIG. 1, FIG. 2, and FIG. 3, the present embodiment will be described using a case in which a three-dimensional object is manufactured on a first working surface 91 of the object 90 to be processed. The object 90 to be processed is, for example, a metallic plate-shaped member, but the shape and material thereof may be arbitrarily set as long as a three-dimensional object is manufactured thereon. The object 90 to be processed is mounted on the base unit 100. The object to be processed may be part of the three-dimensional object that has already been formed by the three-dimensional deposition device 1.

The control device 20 moves the base unit 100 by the table unit 11 so that the object 90 to be processed on the base unit 100 is disposed below the deposition head 12 in the Z-axis direction. The control device 20 introduces the powder from the powder introduction unit 35 into the deposition head 12 and emits the laser beam L while injecting the powder P from the deposition head 12 along with gas. The powder P has a predetermined convergence diameter and is injected toward the object 90 to be processed on the base unit 100. The laser beam L is emitted to the powder P with a predetermined spot diameter between the deposition head 12 and the object 90 to be processed. Here, the position of the spot diameter of the laser beam L in the Z-axis direction with respect to the position of the convergence diameter of the powder P in the Z-axis direction and the spot diameter at the position of the convergence diameter of the powder P in the Z-axis direction can be controlled by, for example, the movement of the position of the light concentrating unit 49.

In other words, as illustrated in FIG. 2 and FIG. 5, the deposition head 12 introduces the powder P into all the powder passages 43a, 43b, 43c, 43d, 43e, and 43f through the operation of the supply amount control units 61a, 61b, 61c, 61d, 61e, and 61f, and injects the powder P from all the nozzle injection openings 45a, 45b, 45c, 45d, 45e, and 45f, and outputs the laser beam L from the laser path 44 (time t1 in FIG. 6). The focal point F of the laser beam L from the laser path 44 is set in the vicinity of the first working surface 91 of the object 90 to be processed, and the powder P from the nozzle injection openings 45a, 45b, 45c, 45d, 45e, and 45f is injected toward the focal point of the laser beam L. Therefore, the powder P injected from the deposition head 12 is heated by the laser beam L at the focal point F of the laser beam L on the first working surface 91 of the object 90 to be processed. The powder P irradiated with the laser beam L is melted in the vicinity of the first working surface 91 of the object 90 to be processed, and then reaches the first working surface 91 of the object 90 to be processed. The powder P that has reached the first working surface 91 of the object 90 to be processed in the melted state is cooled and solidified. Accordingly, the formed layer 94 is formed on the first working surface 91 of the object 90 to be processed.

The control device 20 irradiates the first working surface 91 of the object 90 to be processed with the laser beam L from the deposition head 12 and injects the powder P while moving the object 90 to be processed in a predetermined movement direction M1 by the table unit 11. Therefore, a formed layer 94 is formed which is continuous to the first working surface 91 of the object 90 to be processed. In such a case, the processing direction by the three-dimensional deposition device is M2. The three-dimensional deposition device 1 repeats the formation of such a formed layer 94, thereby manufacturing a three-dimensional object in which a plurality of formed layers are integrally deposited.

When the deposition head 12 shifts from three-dimensional deposition on the first working surface 91 to three-dimensional deposition on the second working surface 93, the powder P injected on the forward side in the processing direction M2 interferes with the step 92 and part of the second working surface 93. The interference information acquisition unit 56 acquires the shape of the object 90 to be processed in advance, and the operating program for the timing of injection of the powder P and the timing of emission of the laser beam L is set based on the acquired shape of the object 90 to be processed and stored in the storage unit 53. The controller 52 controls the injection of the powder P and the emission of the laser beam L based on the operating program stored in the storage unit 53 (time t2 in FIG. 6).

That is, as illustrated in FIG. 3 and FIG. 6, at time t1, the deposition head 12 injects the powder P from all the nozzle injection openings 45a, 45b, 45c, 45d, 45e, and 45f, and outputs the laser beam L from the laser path 44. Based on the shape of the object 90 to be processed that has been acquired in advance, the operating program determines that, at time t2, the powder P injected from the nozzle injection openings 45e and 45f interferes with the object 90 to be processed. Therefore, at time t2, while the injection of the powder P from the nozzle injection openings 45e and 45f is stopped, the injection amount of the powder P from the nozzle injection openings 45a, 45b, 45c, and 45d is increased. At this time, the total injection amount of the powder P injected from the nozzle injection openings 45e and 45f is evenly distributed and added to the injection amounts of the powder P injected from the nozzle injection openings 45a, 45b, 45c, and 45d so that the amount of the powder P injected from the deposition head 12 does not vary before and after the injection of the powder P from the nozzle injection openings 45e and 45f is stopped. Since there is no change in the total amount of the powder P injected at this time, the output of the laser beam L is maintained.

Therefore, the injected powder P does not scatter in the path of the laser beam L, the output of the laser beam L is not attenuated, and an insufficient amount of deposition of the powder P (the thickness of formed layer 94) due to some powder P not reaching the first working surface 91 does not occur. Then, based on the operating program, at time t3, the interference between the powder P injected from the nozzle injection openings 45e and 45f and the processing direction M2 is released. Therefore, at time t3, while the injection of the powder P from the nozzle injection openings 45e and 45f is resumed, the injection amount of the powder P from the nozzle injection openings 45a, 45b, 45c, and 45d is reduced. Specifically, the deposition head 12 injects the same amount of the powder P from each of the nozzle injection openings 45a, 45b, 45c, 45d, 45e, and 45f, and outputs the laser beam L from the laser path 44.

Figure 7:
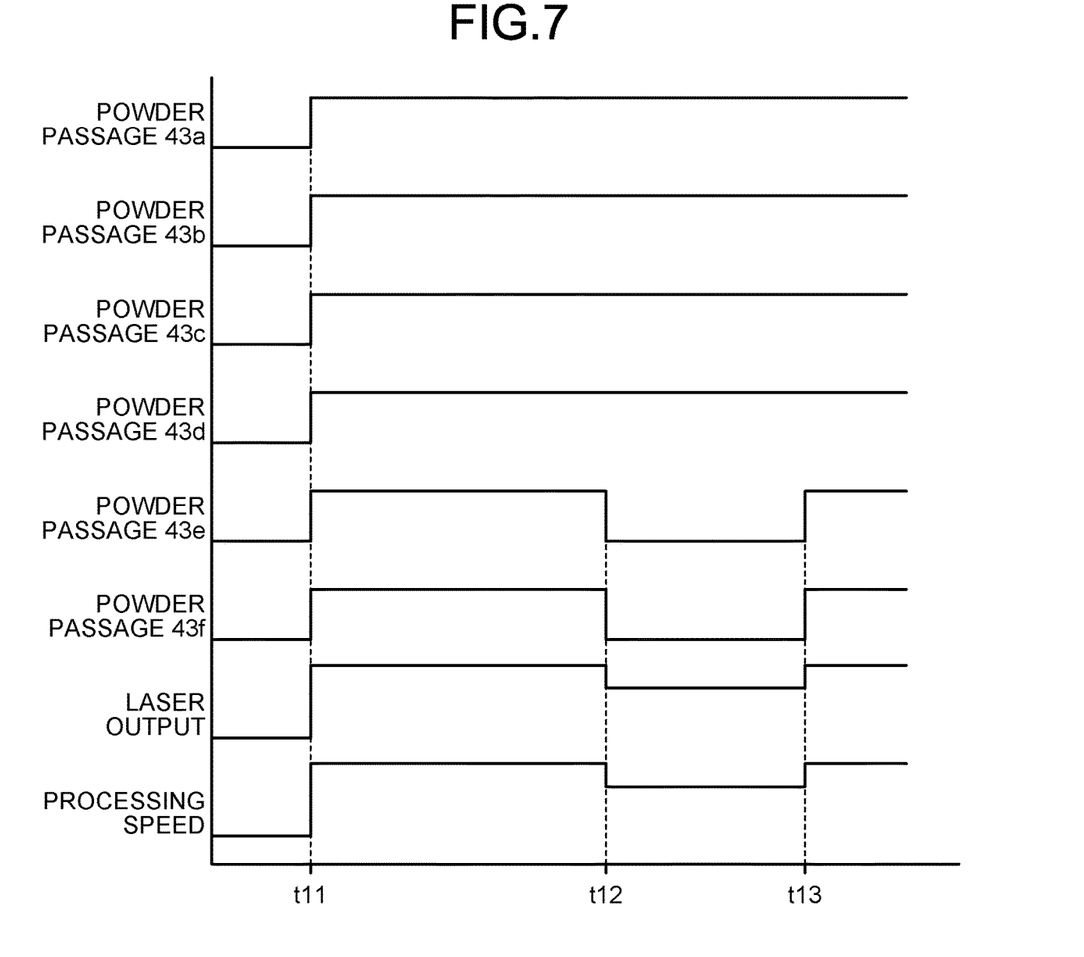
FIG. 7 is a time chart of a second control method of changing a supply path of the powder material by the control device.

The present embodiment is not limited to the above-described control. FIG. 7 is a time chart of the second control method of changing a supply path of a powder material by the control device.

As illustrated in FIG. 3 and FIG. 7, at time t11, the deposition head 12 injects the powder P from all the nozzle injection openings 45a, 45b, 45c, 45d, 45e, and 45f, and outputs the laser beam L from the laser path 44. Based on the operating program, at time t12, the powder P injected from the nozzle injection openings 45e and 45f interferes with the object 90 to be processed. Therefore, at time t12, the injection of the powder P from the nozzle injection openings 45e and 45f is stopped, and correspondingly to the reduction in the total amount of the supplied powder P, the output of the laser beam L emitted from the laser path 44 is reduced and the processing speed of the object 90 to be processed is reduced. The relation between the injection amount of the powder P, the output of the laser beam L, and the processing speed of the object 90 to be processed is confirmed in advance through an experiment or simulation, and the output of the laser beam L and the processing speed of the object 90 to be processed are set so that the thickness and the quality of the formed layer 94 will not vary.

Therefore, the injected powder P does not scatter in the path of the laser beam L, the output of the laser beam L is not attenuated, variation in the amount of the deposition of the powder P (formed layer 94 thickness) due to some powder P not reaching the first working surface 91 is suppressed, and the quality is not degraded. Then, based on the operating program, at time t13, the interference between the powder P injected from the nozzle injection openings 45e and 45f and the object 90 to be processed is released. Therefore, at time t13, the injection of the powder P from the nozzle injection openings 45e and 45f is resumed, the output of the laser beam L emitted from the laser path 44 is increased, and the processing speed of the object 90 to be processed is increased. In other words, the state before time t12 is restored.

In the above description, the controller 52 is configured to control the injection of the powder P and the emission of the laser beam L based on the operating program stored in the storage unit 53, but it is not limited to this configuration. As illustrated in FIG. 2 and FIG. 3, a configuration may be employed in which, for example, a detector 71 serving as the interference information acquisition unit 56 is provided to the deposition head 12, which detects or estimates the reaching status of the powder P injected from the nozzle injection openings 45a, 45b, 45c, 45d, 45e, and 45f to the object to be processed, and the injection of the powder P and the emission of the laser beam L is controlled based on the information acquired by the detector 71. The detector 71 outputs a detection result to the controller 52 online while three-dimensional deposition is being performed using the deposition head 12.

Figure 8:
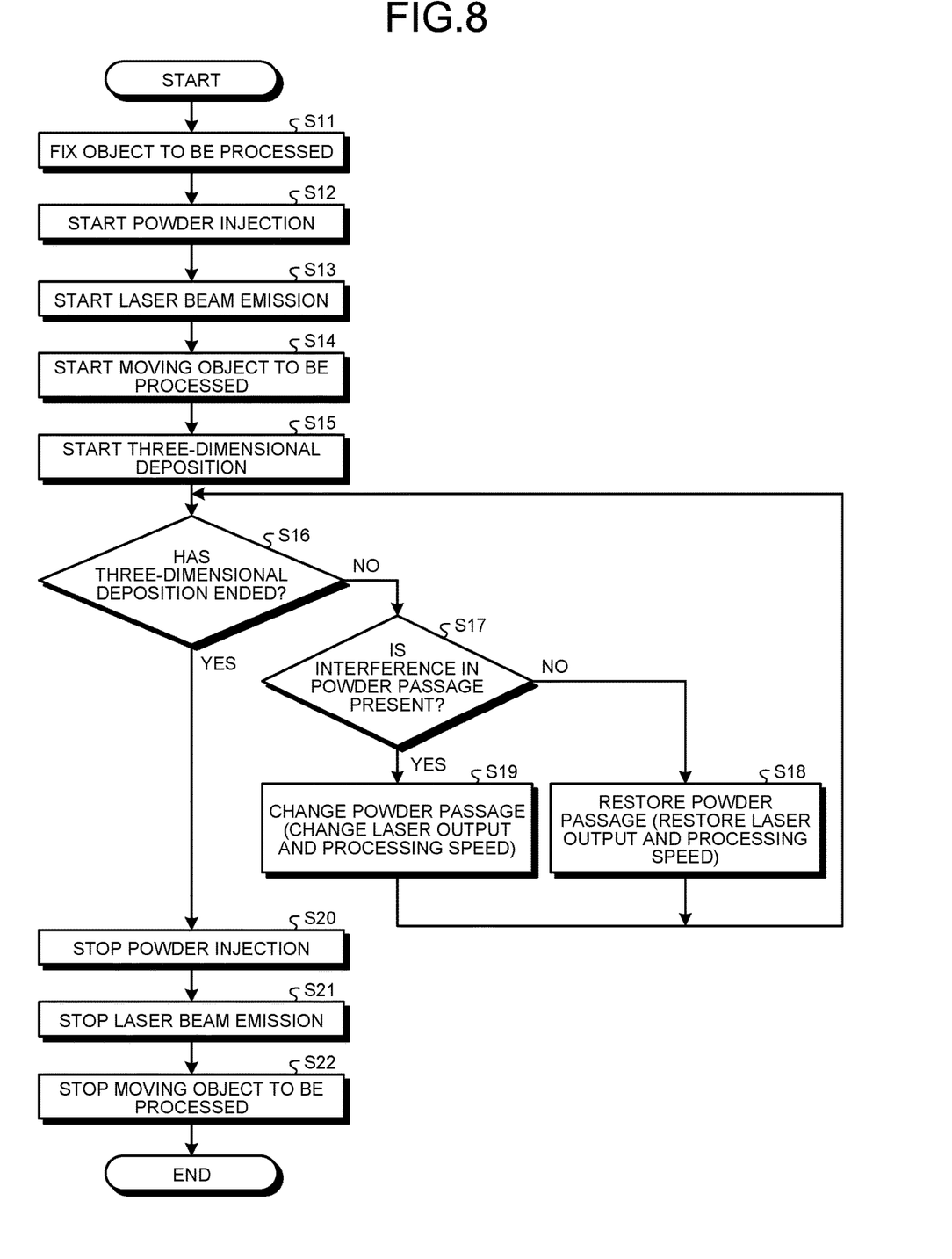
FIG. 8 is a flowchart illustrating a method of manufacturing a three-dimensional object by the three-dimensional deposition device.

Here, a method of manufacturing a three-dimensional object using the three-dimensional deposition device 1 will be described. FIG. 8 is a flowchart illustrating a method of manufacturing the three-dimensional object by the three-dimensional deposition device.

As illustrated in FIG. 8, at step S11, the object 90 to be processed is mounted on the base unit 100, and the control device 20 moves the base unit 100 by the table unit 11 so that the object 90 to be processed on the base unit 100 is disposed below the deposition head 12 in the Z-axis direction. At step S12, the control device 20 introduces the powder from the powder introduction unit 35 into the deposition head 12 and injects the powder P from the deposition head 12 along with the gas. At step S13, the control device 20 emits the laser beam L. Then, at step S14, the object 90 to be processed is moved along with the base unit 100. Then, three-dimensional deposition is started at step S15 and thereafter.

That is, as illustrated in FIG. 2 and FIG. 5, the deposition head 12 introduces the powder P into all the powder passages 43a, 43b, 43c, 43d, 43e, and 43f by the supply amount control units 61a, 61b, 61c, 61d, 61e, and 61f, injects the powder P from all the nozzle injection openings 45a, 45b, 45c, 45d, 45e, and 45f, and outputs the laser beam L from the laser path 44. The focal point F of the laser beam L from the laser path 44 is set in the vicinity of the first working surface 91 of the object 90 to be processed, and the powder P from the nozzle injection openings 45a, 45b, 45c, 45d, 45e, and 45f is injected toward the focal point of the laser beam L. Therefore, the powder P injected from the deposition head 12 is heated by the laser beam L at the focal point F of the laser beam L on the first working surface 91 of the object 90 to be processed. The powder P irradiated with the laser beam L is melted in the vicinity of the first working surface 91 of the object 90 to be processed, and then reaches the first working surface 91 of the object 90 to be processed. The powder P that has reached the first working surface 91 of the object 90 to be processed in the melted state is cooled and solidified. Accordingly, the formed layer 94 is formed on the first working surface 91 of the object 90 to be processed.

At step S16, the control device 20 determines whether the three-dimensional deposition has ended. If it is determined that the three-dimensional deposition has not ended (No), at step S17, the controller 52 determines whether interference has occurred (or is estimated to occur) between the object 90 to be processed and the powder P injected from the nozzle injection openings 45a, 45b, 45c, 45d, 45e, and 45f based on the interference information on the object to be processed with the powder P injected from the nozzle injection openings 45, the interference information being acquired by the interference information acquiring unit 56. The interference between the powder P and the object 90 to be processed may be determined based on the shape data of the object 90 to be processed acquired by the interference information acquisition unit 56, or based on a detection result obtained by the detector 71. If it is determined that no interference has occurred (No) between the object 90 to be processed and the powder P injected from the nozzle injection openings 45a, 45b, 45c, 45d, 45e, and 45f, an injection mode of the powder P and an emission mode of the laser beam L are maintained as they are at step S18, and the process is returned to step S16 to repeat the processing. In contrast, for example, if it is determined that interference has occurred (Yes) between the object 90 to be processed and the powder P injected from the nozzle injection openings 45e and 45f among the nozzle injection openings 45a, 45b, 45c, 45d, 45e, and 45f, the injection of the powder P from the nozzle injection openings 45e and 45f is stopped, and the injection amount of the powder P from the nozzle injection openings 45a, 45b, 45c, and 45d is increased (first control method) at step S19. Alternatively, the injection of the powder P from the nozzle injection openings 45e and 45f is stopped, the output of the laser beam L emitted from the laser path 44 is reduced, and the processing speed of the object 90 to be processed is reduced (second control method).

Then, the process is returned to step S16 again, and the control device 20 determines whether the three-dimensional deposition has ended. If it is determined that the three-dimensional deposition has not ended (No), the controller 52 determines at step S17 whether interference between the powder P and the object 90 to be processed has occurred. If it is determined that interference has occurred (Yes) between the powder P and the object 90 to be processed, the process is returned to step S16 via step S19, and the processing is continued. In contrast, if it is determined that the interference between the powder P and the object 90 to be processed has been released (No), the injection of the powder P from the nozzle injection openings 45e and 45f is resumed, and the injection amount of the powder P from the nozzle injection openings 45a, 45b, 45c, and 45d is reduced at step S18. In other words, the injection amount of the powder P from the nozzle injection openings 45a, 45b, 45c, 45d, 45e, and 45f is restored. Alternatively, the injection of the powder P from the nozzle injection openings 45e and 45f is resumed, the output of the laser beam L emitted from the laser path 44 is increased, and the processing speed of the object 90 to be processed is increased. In other words, the injection amount of the powder P from the nozzle injection openings 45a, 45b, 45c, 45d, 45e, and 45f, the output of the laser beam L, and the processing speed of the object 90 to be processed are restored.

Then, the process is returned to step S16 again, and the control device 20 determines whether the three-dimensional deposition has ended. If it is determined that the three-dimensional deposition has ended (Yes), the control device 20 stops introduction of the powder from the powder introduction unit 35 into the deposition head 12 and stops the injection of the powder P from the deposition head 12 along with the gas at step S20. At step S21, the control device 20 stops the emission of the laser beam L. Then, at step S22, the control device 20 stops the movement of the object 90 to be processed along with the base unit 100.

Thus, the three-dimensional deposition device of the present embodiment includes: the powder passages 43 and the nozzle injection openings 45 serving as a powder supply unit that supplies the powder P to the processing object 90; the laser path 44 serving as the light irradiation unit that irradiates the powder P with the laser beam L to sinter or melt and solidify at least part of the powder P irradiated with the laser beam L to form a formed layer 94; the interference information acquisition unit 56 that acquires the interference information on the object 90 to be processed with the powder P injected from the nozzle injection opening 45 based on the shape of the object 90 to be processed; and the controller 52 that changes the powder passages 43 of the powder P supplied from the nozzle injection openings 45 toward the object 90 to be processed based on the interference information acquired by the interference information acquisition unit 56.

Therefore, the controller 52 identifies an area where the powder P injected from the nozzle injection openings 45 interferes with the object 90 to be processed, and the nozzle injection openings 45 supply the powder P to the object 90 to be processed from an area where the powder P injected from the nozzle injection openings 45 does not interfere with the object 90 to be processed. As a result, the powder P does not interfere with the object 90 to be processed and does not scatter, the output of the laser beam L is not attenuated, a determined amount of the powder P can be supplied to the object 90 to be processed, whereby the quality of a three-dimensional object can be improved.

In the three-dimensional deposition device of the present embodiment, the deposition head 12 includes the powder passages 43a, 43b, 43c, 43d, 43e, and 43f and the nozzle injection openings 45a, 45b, 45c, 45d, 45e, and 45f, and the controller 52 stops injection of the powder P from at least one of the nozzle injection openings 45a, 45b, 45c, 45d, 45e, and 45f, the at least one nozzle injection opening injecting the powder P that is estimated to interfere with the object 90 to be processed. Therefore, it is possible to prevent scattering of the powder P occurring when the powder P interferes with the object 90 to be processed, while it is possible to supply the powder P to the object 90 to be processed, and to properly manufacture a three-dimensional object regardless of the shape of the object to be processed.

In the three-dimensional deposition device of the present embodiment, the controller 52 increases, when stopping injection of the powder P from the at least one of the nozzle injection openings 45a, 45b, 45c, 45d, 45e, and 45f, the at least one nozzle injection opening injecting the powder P that is estimated to interfere with the object 90 to be processed, the injection amount of the powder P from the nozzle injection openings 45a, 45b, 45c, 45d, 45e, and 45f other than the at least one of the nozzle injection openings 45a, 45b, 45c, 45d, 45e, and 45f, the at least one nozzle injection opening having stopped the injection of the powder P. Therefore, it is possible to constantly supply an appropriate amount of the powder P to the object 90 to be processed, and to prevent degradation of the quality of the three-dimensional object.

In the three-dimensional deposition device of the present embodiment, the controller 52 adjusts, for example, decreases the output of the laser beam L emitted from the laser path 44 when stopping the injection of the powder P from the at least one of the nozzle injection openings 45a, 45b, 45c, 45d, 45e, and 45f, the at least one nozzle injection opening injecting the powder P that is estimated to interfere with the object 90 to be processed. Therefore, it is possible to output the laser beam L corresponding to the reduced amount of supply of the powder P, and to prevent degradation of the quality of the three-dimensional object.

In the three-dimensional deposition device of the present embodiment, the controller 52 adjusts, for example, decreases the processing speed of the object 90 to be processed when stopping the injection of the powder P from the at least one of the nozzle injection openings 45a, 45b, 45c, 45d, 45e, and 45f, the at least one nozzle injection opening injecting the powder P that is estimated to interfere with the object 90 to be processed. Therefore, it is possible to achieve the processing speed corresponding to the reduced amount of supply of the powder P, and to prevent degradation of the quality of the three-dimensional object.

In the three-dimensional deposition device of the present embodiment, the interference information acquisition unit 56 acquires the shape of the object 90 to be processed in advance, sets the operating program for the injection of the powder P and the emission of the laser beam L based on the acquired shape of the object 90 to be processed, and the controller 52 controls the injection of the powder P and the emission of the laser beam L based on the operating program. Therefore, it is possible to prevent interference between the injected powder P and the object 90 to be processed regardless of the shape of the object 90 to be processed.

In the three-dimensional deposition device of the present embodiment, as the interference information acquisition unit 56, the detector 71 is provided to detect or estimate the reaching status of the powder P injected from the nozzle injection opening 45 to the object 90 to be processed, and the controller 52 controls the injection of the powder P based on a detection result obtained by the detector 71. Therefore, it is possible to prevent interference between the injected powder P and the object 90 to be processed regardless of the shape of the object 90 to be processed.

In addition, the three-dimensional deposition method of the present embodiment includes: a step of supplying the powder P toward the object 90 to be processed; a step of irradiating the powder P with a laser beam L to sinter or melt and solidify at least part of the powder P irradiated with the laser beam L to form the formed layer 94; a step of acquiring interference information on the object 90 to be processed with the powder P injected from the nozzle injection openings 45 based on the shape of the object 90 to be processed; and a step of changing the powder passages 43 of the powder P supplied from the nozzle injection openings 45 to the object 90 to be processed based on the interference information.

Therefore, the area where the powder P injected from the nozzle injection openings 45 interferes with the object 90 to be processed is identified, and the nozzle injection openings 45 supply the powder P to the object 90 to be processed from the area where the powder P injected from the nozzle injection openings 45 does not interfere with the object 90 to be processed. As a result, the powder P does not interfere with the object 90 to be processed and does not scatter, the output of the laser beam L is not attenuated, a determined amount of the powder P can be supplied to the object 90 to be processed, whereby the quality of a three-dimensional object can be improved.

In the above-described embodiment, the interference information acquisition unit 56 is the detector 71 that detects or estimates the reaching status of the powder P injected from the nozzle injection openings 45a, 45b, 45c, 45d, 45e, and 45f to the object 90 to be processed, but it is not limited to this configuration. For example, the interference information acquisition unit 56 may be a CCD camera, the CCD camera may capture the shape of the object 90 to be processed, and the controller 52 may determine the interference between the powder P and the object 90 to be processed based on the shape of the object 90 to be processed.

Furthermore, in the aforementioned embodiment, the powder material injected by the powder supply unit is a metallic powder material; however, a non-metallic powder material such as a resin powder material may be used. Furthermore, the laser beam is used as a light beam; however, an electron beam and the like may be used.

REFERENCE SIGNS LIST

1 THREE-DIMENSIONAL DEPOSITION DEVICE
2 THREE-DIMENSIONAL DEPOSITION CHAMBER
3 SPARE CHAMBER
4 DEPOSITION HEAD ACCOMMODATION CHAMBER
4a, 5a Z-AXIS SLIDE UNIT
5 MACHINING UNIT ACCOMMODATION CHAMBER
6, 7 DOOR
10 BED
11 TABLE UNIT
12 DEPOSITION HEAD
13 MACHINING UNIT

15 Y-AXIS SLIDE UNIT
16 X-AXIS SLIDE UNIT
17 ROTATION TABLE UNIT
17A FIXING BASE
17b ROTATION TABLE
17c INCLINATION TABLE
17d ROTATION TABLE
18, 19 BELLOWS
20 CONTROL DEVICE
22 TOOL
23 NOZZLE
24 FRONT END
25 AIR DISCHARGE UNIT
30 SHAPE MEASUREMENT UNIT
31 HEATING HEAD
32 DEVICE MEASUREMENT UNIT
33 TOOL EXCHANGE UNIT
34 NOZZLE EXCHANGE UNIT
35 POWDER INTRODUCTION UNIT
36 BASE MOVEMENT UNIT
37 AIR DISCHARGE UNIT
38 GAS INTRODUCTION UNIT
39 POWDER COLLECTION UNIT
41 OUTER TUBE
42 INNER TUBE
43, 43a, 43b, 43c, 43d, 43e, and 43f POWDER PASSAGE (POWDER SUPPLY UNIT)
44 LASER PATH (LIGHT IRRADIATION UNIT)
45, 45a, 45b, 45c, 45d, 45e, and 45f NOZZLE INJECTION OPENING (POWDER INJECTION UNIT)
46 MAIN BODY
47 LIGHT SOURCE
48 OPTICAL FIBER
49 LIGHT CONCENTRATING UNIT
51 INPUT UNIT
52 CONTROLLER
53 STORAGE UNIT
54 OUTPUT UNIT
55 COMMUNICATION UNIT
56 INTERFERENCE INFORMATION ACQUISITION UNIT
61, 61a, 61b, 61c, 61d, 61e, 61f SUPPLY AMOUNT CONTROL UNIT
71 DETECTOR
72 BRACKET
90 OBJECT TO BE PROCESSED
91 FIRST WORKING SURFACE
92 STEP
93 SECOND WORKING SURFACE
94 FORMED LAYER
100 BASE UNIT
102, 104, 106, 108 ARROW
110 ROTATION SHAFT
F FOCAL POINT
L LASER BEAM (LIGHT BEAM)
M1 MOVEMENT DIRECTION
M2 PROCESSING DIRECTION
O CENTRAL AXIS
P POWDER

The invention claimed is:

1. A three-dimensional deposition device configured to form a three-dimensional object by depositing a formed layer on an object to be processed, the three-dimensional deposition device comprising:
a powder supply unit configured to supply a powder material to a working surface of the object to be processed:
a light irradiation unit configured to irradiate the powder material with a light beam to sinter or melt and solidify at least a part of the powder material irradiated with the light beam to form the formed layer;
an interference information acquisition detector configured to acquire interference information on the object to be processed with the powder material injected from the powder supply unit based on the shape of the object to be processed; and
a controller configured to change a supply path of the powder material supplied from the powder supply unit to a working surface of the object to be processed based on the interference information acquired by the interference information acquisition detector,
wherein the powder supply unit includes a plurality of powder injection units provided around the light irradiation unit at predetermined intervals in a circumferential direction, and the controller stops injection of the powder material from the powder injection unit injecting the powder material that is estimated to interfere with the object to be processed.

2. The three-dimensional deposition device according to claim 1, wherein, when the controller stops the injection of the powder material from the powder injection unit that injects the powder material that is estimated to interfere with the object to be processed, the controller increases an injection amount of the powder material injected from the powder injection unit other than the powder injection unit that has stopped the injection of the powder material.

3. The three-dimensional deposition device according to claim 1, wherein, when the controller stops the injection of the powder material from the powder injection unit that injects the powder material that is estimated to interfere with the object to be processed, the controller adjusts output of the light beam emitted from the light irradiation unit.

4. The three-dimensional deposition device according to claim 3, wherein, when the controller stops the injection of the powder material from the powder injection unit that injects the powder material that is estimated to interfere with the object to be processed, the controller adjusts the processing speed of the object to be processed.

5. The three-dimensional deposition device according to claim 1, wherein the interference information acquisition detector acquires a shape of the object to be processed in advance, an operating program of the powder supply unit and the light irradiation unit is set based on the acquired shape of the object to be processed, and the controller controls the powder supply unit or the light irradiation unit based on the operating program.

6. The three-dimensional deposition device according to claim 1, wherein the interference information acquisition detector includes a detector that detects or estimates a reaching status of the powder material supplied from the powder supply unit to the object to be processed, and the controller controls the powder supply unit based on a detection result obtained by the detector.

7. A three-dimensional deposition method of forming a three-dimensional object by depositing a formed layer on an object to be processed, the three-dimensional deposition method comprising:
a step of supplying a powder material toward a working surface of the object to be processed from a powder supply unit includes a plurality of powder injection units provided around a light irradiation unit at predetermined intervals in a circumferential direction;
a step of irradiating the powder material with a light beam to sinter or melt and solidify at least a part of the powder material irradiated with the light beam to form the formed layer from the light irradiation unit;
a step of acquiring interference information on the object to be processed with the powder material based on the shape of the object to be processed; and
and a step of changing a supply path of the powder material to the object to be processed based on the interference information,
wherein in the step of changing the supply path, stopping injection of the powder material from the powder injection unit injecting the powder material that is estimated to interfere with the object to be processed.

\* \* \* \* \*